United States Patent
Harris et al.

(10) Patent No.: US 6,826,580 B2
(45) Date of Patent: Nov. 30, 2004

(54) DISTRIBUTED STORAGE RESOURCE MANAGEMENT IN A STORAGE AREA NETWORK

(75) Inventors: Gordon J. Harris, Somerset, NJ (US); Stephen A. Rago, Berkeley Heights, NJ (US); Timothy H. Williams, Spring Lake, NJ (US)

(73) Assignee: EMC Corporation, Hopkinton, MA (US)

( * ) Notice: Subject to any disclaimer, the term of this patent is extended or adjusted under 35 U.S.C. 154(b) by 370 days.

(21) Appl. No.: 09/766,526

(22) Filed: Jan. 19, 2001

(65) Prior Publication Data

US 2001/0047482 A1 Nov. 29, 2001

Related U.S. Application Data

(60) Provisional application No. 60/178,246, filed on Jan. 20, 2000.

(51) Int. Cl.[7] ............................................... G06F 17/30
(52) U.S. Cl. ........................................ 707/202; 707/10
(58) Field of Search ........................... 707/202, 10, 200, 707/201, 203, 204; 709/203; 714/11, 6, 7

(56) References Cited

U.S. PATENT DOCUMENTS

| 5,390,327 A | | 2/1995 | Lubbers et al. ................ 714/7 |
| 5,522,031 A | | 5/1996 | Ellis et al. ...................... 714/6 |
| 5,574,851 A | | 11/1996 | Rathunde ....................... 714/7 |
| 5,999,930 A | | 12/1999 | Wolff ............................ 707/8 |
| 6,067,545 A | * | 5/2000 | Wolff ........................... 707/10 |
| 6,185,601 B1 | * | 2/2001 | Wolff ......................... 709/203 |
| 6,578,158 B1 | * | 6/2003 | Deitz et al. .................. 714/11 |

* cited by examiner

Primary Examiner—Sanjiv Shah
(74) Attorney, Agent, or Firm—Fish & Richardson P.C.

(57) ABSTRACT

A method and system for managing storage resources associated with a network having at least one storage resource coupled to at least one server and at least one client over at least one data path. The method and system includes servers managing the storage resource over the data path, and clients directing I/O requests to the storage resources and redirecting I/O requests to the servers upon the detection of a failure condition.

9 Claims, 8 Drawing Sheets

DISTRIBUTED STORAGE RESOURCE MANAGEMENT IN A STORAGE AREA NETWORK

CROSS REFERENCE TO RELATED APPLICATION

This application claims the benefit of the priority document U.S. Ser. No. 60/178,246 filed 20 Jan. 2000.

TECHNICAL FIELD

This invention relates to storage resource management in a computer network, and more particularly to distributed storage management in a storage area network (SAN).

BACKGROUND

The emergence of fibre channel as a networking technology designed specifically for storage resources has been a primary impetus in the ongoing development of SAN technology in enterprise computing environments. These technologies, coupled with the changing needs of users, are causing the demand for storage to accelerate. Consequently, this has increased the basic requirement of managing, storing, and accessing storage resources in a SAN.

A SAN interconnects different kinds of storage resources with associated data servers on behalf of a larger network of users represented by client computers. Typically, the SAN uses fibre channel technology to facilitate high bandwidth communication between the storage resources and the data servers. The storage resources are usually implemented using physical data storage configurations such as Redundant Arrays of Inexpensive Disks (RAID), simple disk arrays, and complex disk subsystems. The data servers manage the storage resources using a traditional volume manager comprising a data access portion and a data management portion. The data management portion is responsible for managing the physical data storage devices including abstracting the physical device and presenting to the client computer user a logical unit of storage called a volume. The data management portion also is responsible for backup and restore, data migration from one storage device to another, and the sharing of data. In contrast, the data access portion of the volume manager is responsible for converting the logical data requests issued by the clients into data transfer operations directed to the physical storage corresponding to the logical device. Once the physical data blocks corresponding to the requested logical blocks have been retrieved, the server handles the data transfer over the fibre channel and delivers the blocks to the client computer.

However, sharing storage resources using a SAN infrastructure is currently limited. A typical SAN may interconnect to other computer systems including other networks and servers. While these interconnections allow these systems to share data, it could also lead to not only the possibility of data corruption but also to an increase in the complexity of managing these storage resources. System administrators responsible for managing the SAN and its storage resources are faced with a time consuming and costly management task.

One solution involves the use of zoning, in which a fibre channel switch is placed between storage resources and a computer system. The switch is programmed to grant to the computer system access to the storage resource that has been configured for the port. However, this solution is severely limited because in a large "fabric" effective zoning may require the programming of several layers of switches to represent the correct grouping, which can be difficult and prone to error. Moreover, if it becomes necessary to rearrange the cables associated with the fibre channel, this can impact the current access of storage to other computer systems, because the port numbers can change.

Another solution might include placing an intermediate computer between the storage resource and the other computer systems to mediate access to the storage. The intermediate computer intercepts all input/output (I/O) requests flowing to the disks and routes the requests as required. The intermediate computer must be capable of storing and forwarding the requests. To avoid a loss in performance, the intermediate computer must have twice the bandwidth of the incoming fibre channel connection. However, in a multi-port storage topology, the bandwidth requirement increases dramatically, leading to an increase in cost. The intermediate computer does alleviate the management problem by providing the system administrator with a single management console for zoning and virtual volume management. Although the intermediate computer provides attractive management capabilities, it lacks scalability and is costly to implement.

In many enterprise computer environments, the storage resource typically is implemented using different levels of RAID. Although RAID configurations provide improved I/O performance and/or reliability, management can be complex. For example, if an enterprise is running heterogeneous host computer systems, then a system administrator must deal with multiple management interfaces. The RAID volume may need to be modified if any of the components of the RAID have failed or if the administrator has changed the configuration. To avoid downtime when modifying the RAID configuration, it must be rebuilt while online which may impact the I/O performance of the running host computer system and client systems.

In light of the foregoing, a SAN infrastructure that is able to share storage resources by distributing the volume management functions between server computers responsible for data management and client computers responsible for data access would be an improvement in the art.

SUMMARY

In a first aspect, the invention provides a method of managing storage resources associated with a computer network. The method includes managing storage resources associated with a network having at least one storage resource coupled to at least one server and at least one client over at least one data path, wherein the client directs I/O requests to the storage resources and redirects I/O requests to the server upon the detection of a failure condition.

In one implementation, the method includes the communication of volume information associated with the storage resource to a client based on the results of the authentication. In yet another implementation, the method includes the allocation of storage space from the storage resource in response to a client request, and the communication of volume information associated with the allocated space to the requesting client. In another implementation, the method comprises the allocation of a new storage space from the storage resource in response to a receipt of a failure condition, wherein the new storage space includes a new virtual disk associated with a new physical storage resource; the initiation of the recovery of the contents associated with the failure condition in cooperation with the new storage space; and the communication of a recovery status to the client, wherein the client and the server continue the recovery based on the recovery status. The method also comprises changing the volume configuration corresponding to the storage resource; committing the changes to the changed configuration during which time the client is excluded from accessing the storage resource; and communicating the new state of the configuration to the client. In another implementation, the method comprises providing a copy of unmodified data blocks before modifying the data blocks; communicating a list of the modified data blocks to a backup process residing on the server, wherein the backup process uses a pseudo-device to read the unmodified and modified data blocks.

In a second aspect, the invention provides a distributed shared resource management system. This system includes at least one storage resource coupled to at least one server and at least one client over at least one data path, wherein the server manages the storage resource over the data path, and the client directs I/O requests to the storage resource and redirects the I/O requests to the server upon the detection of a failure condition. This system is adapted to operate according to the method described above.

In a third aspect, the invention provides an article comprising a computer-readable medium that stores computer executable instructions for controlling a computer in a distributed shared storage resource management system in which system comprises at least one storage resource coupled to at least one server and at least one client over at least one data path, wherein the computer executable instructions cause system to operate according to the methods described above.

With the methods and systems for managing storage resources associated with a storage network disclosed in the present invention, the management of volumes may be advantageously centralized using a common management interface. In addition, storage resources can be shared in a secure environment without requiring an intermediate node. Furthermore, the more complex volume management functions associated with managing the storage resources may be allocated to at least one server, which relieves the client system from performing these tasks. Moreover, client systems may now concentrate on accessing data from the storage resources and offload the recovery process onto the servers which are capable of performing this process efficiently.

The details of various embodiments of the invention including certain preferred embodiments are set forth in the accompanying drawings and the description below. Other features, objects, and advantages of the invention will be apparent from the description, drawings, and claims.

DESCRIPTION OF DRAWINGS

Like reference symbols in the various drawings indicate like elements.

DETAILED DESCRIPTION

Figure 1:
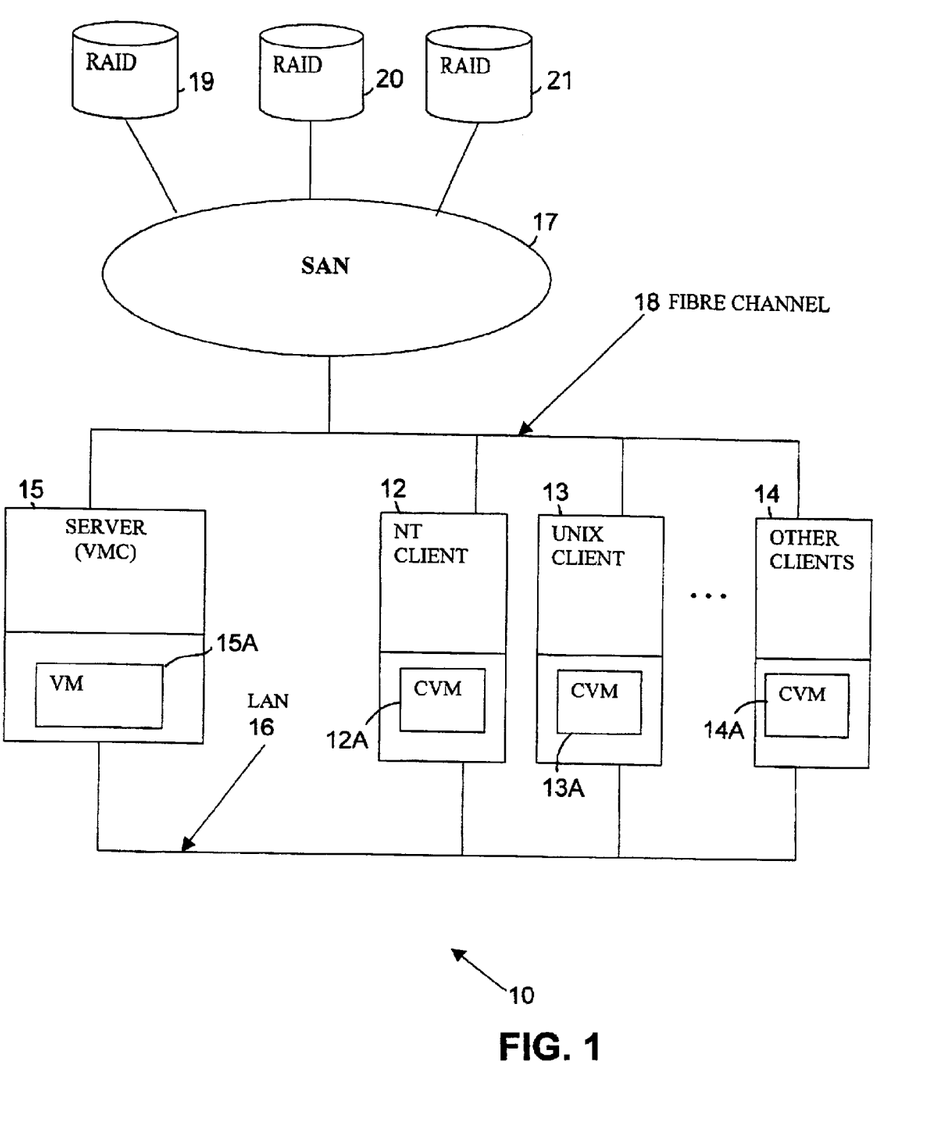
FIG. 1 is a system diagram illustrating a distributed storage management architecture according to the present invention.

FIG. 1 is a system diagram illustrating a distributed storage management architecture 10 implemented in a SAN 17 according to the present invention. Each client computer system 12, 13, 14 communicates with a volume management controller (VMC) 15 over a local area network (LAN) 16 such as Ethernet. By way of non-limiting example, LAN 16 embodiments may also include fiber distributed data interface (FDDI), Token Ring, asynchronous transfer mode (ATM), a wireless LAN based on an IEEE 802.11 standard, or other suitable types of networks. The client computer systems 12, 13, 14 are each running a client volume management (CVM) module 12A, 13A, 14A which is responsible for accessing the data on storage resources 19, 20, 21 such as may be in a RAID configuration. The client computer systems 12, 13, 14 may be running the same or different operating systems (OSs), for example, client 12 may be running Windows NT® while client 13 may be running UNIX®. The client systems 12, 13, 14 also may communicate with the VMC 15 over the SAN 17 via a fibre channel 18 if the necessary protocols can use the SAN 17 as a communication medium.

The client computers 12, 13, 14 view the data on the storage resources 19, 20, 21 as a logical representation of data called a volume where each volume contains logical data units called data blocks. The client systems 12, 13, 14 access the volumes containing logical data blocks without knowledge of the underlying structure of the storage resource. The client systems 12, 13, 14 access data blocks directly from the storage resource 19, 20, 21 over the fibre channel 18 coupled to the SAN 17. Embodiments of the client systems 12, 13, 14 may include, but is not limited to, personal computers (PC), workstations, portable handheld computing devices such as a personal digital assistant (PDA), and other types of electronic devices adapted with a processor. Additional non-limiting embodiments also include a low-cost PC designed for Internet access and specialized business purposes called a network appliance, but which does not have the full capabilities of PCs.

The VMC 15 is running a volume manager (VM) 15A which is a module responsible for managing the storage resources 19, 20, 21. Although the VMC 15 is shown as a single server, in a preferred embodiment, the VMC 15 may be implemented as a cluster of servers. In the cluster arrangement, the VM 15A module may be duplicated on each of the servers across the cluster. So if one server in the cluster fails, the VM 15A is still accessible from an operational server. Embodiments of servers that can be deployed as a VMC include high-end enterprise host computers, special purpose computers such as data-warehousing data servers, or other types of host computers.

In a preferred embodiment, the storage resources 19, 20, 21 can comprise different levels of RAID. For example, in a RAID 0 configuration, the data on a storage device is distributed across several devices but does not provide redundant information. This technique is called "striping" and improves I/O performance, but lacks reliability. In contrast, under a RAID 1 implementation, the data is "mirrored" or duplicated onto other storage devices. In this technique the data is duplicated, thus increasing reliability since data can be recovered if a disk fails. On the other hand, in a RAID 4 implementation, the data is distributed in a similar fashion to RAID 0 but redundant information is stored onto a dedicated parity disk. The parity information allows a RAID 4 subsystem to recover data after a single disk failure. RAID 5 is similar to RAID 4 except the redundant information is interspersed with user data across all the disks. In other embodiments, the storage resources may be configured to include disk subsystems containing tape, CD-ROM, removable storage, optical drives, or other types of storage resource devices.

Figure 1A:
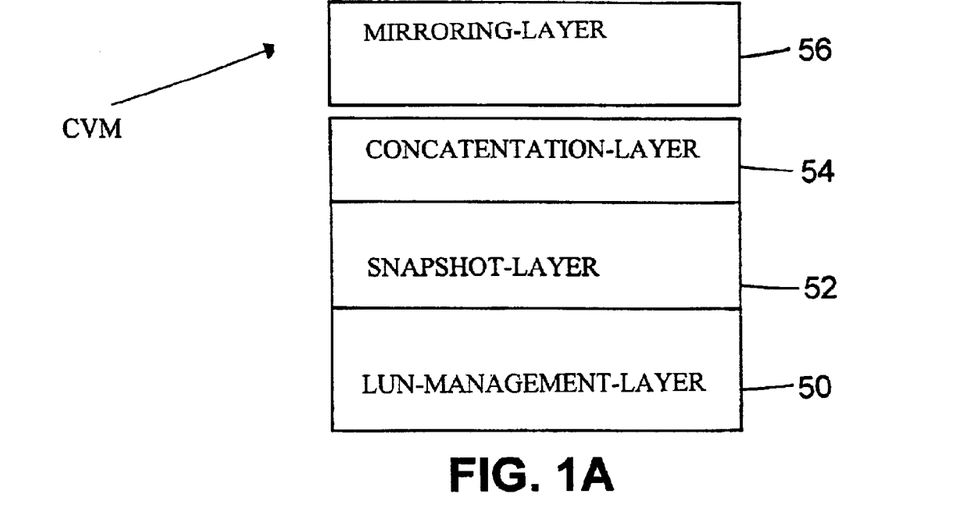
FIG. 1A is a block diagram illustrating program layers in a CVM according to the present invention.

FIG. 1A is a block diagram illustrating the different program layers usually contained in the CVM 12A, 13A, 14A according to the present invention. These different layers are responsible for accessing and handling the data stored on the storage resources. The client-management-layer 48 provides the framework upon which the other layers of the CVM are constructed. It provides the fundamental volume management capabilities necessary for the client to access the storage resources. The logical-unit-number-management-layer (LUN-management-layer) 50 is responsible for handling access to authorized storage resources managed by the VMC. The snapshot-layer 52 is used to implement reliable backups. The concatenation-layer 54 handles making multiple physical resources appear as one logical device without knowledge of the underlying resources. The striping-layer 56 allows data to be spread across several storage resources to increase I/O performance.

The "mirroring" portion of the "RAID X/mirroring-layer" 58 manages the task of reading from and writing to multiple storage resources to access the same data As discussed above, the storage resources can be arranged according to any one of the conventional RAID configurations known in the art. The selection of a particular configuration depends on several factors including cost, reliability, and performance tradeoffs. The "RAID X" portion of layer 58 is responsible for handling storage resources configured in a RAID arrangement. The 'X' in "RAID X" refers to the different possible RAID levels that can be implemented. For example, in a RAID 4 configuration, parity information associated with the data is stored in the storage resources for reliability purposes.

In a preferred embodiment, a CVM framework should contain all five layers, however, the minimum CVM configuration requires the presence of the client-management-layer 48 and the LUN-management-layer 50. The CVM provides the client with the flexibility of selecting the layers that are necessary for the specific application environment. For example, if reliability were critical to the application, then layer 58 would be necessary to include in the CVM. On the other hand, layer 56 might be included if data performance is an issue. Alternatively, both layer 56 and 58 may be incorporated in the CVM framework if both high reliability and increased I/O performance are required by the application as a whole.

Figure 1B:
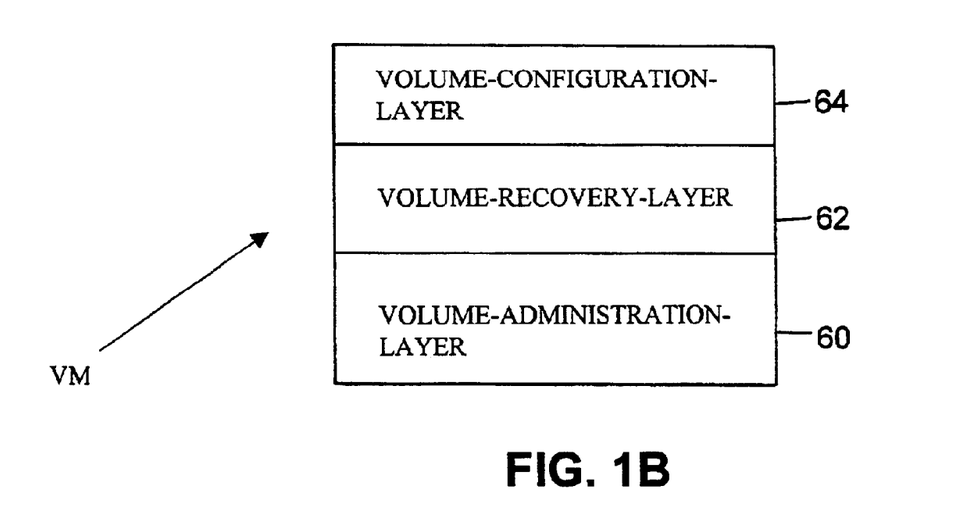
FIG. 1B is a block diagram illustrating program layers in a VM according to the present invention.

FIG. 1B is a block diagram illustrating the program layers in a VM 15A according to the present invention. In general, these layers are responsible for the administration of the storage resources. The volume-administration-layer 60 is responsible for adding, modifying, or deleting volumes within a pool of storage resources. The recovery-layer 62 comprises the recovery methods that manage the recovery of a failed storage device. For example, once a client detects an I/O failure from a storage device, it redirects further I/O requests to the VMC which handles the recovery process. The volume-configuration-layer 64 manages the volume configuration information related to the volumes associated with the storage resources. The volume management functions reside in and are executed by the server, because it handles them more efficiently than a client.

Figure 2:
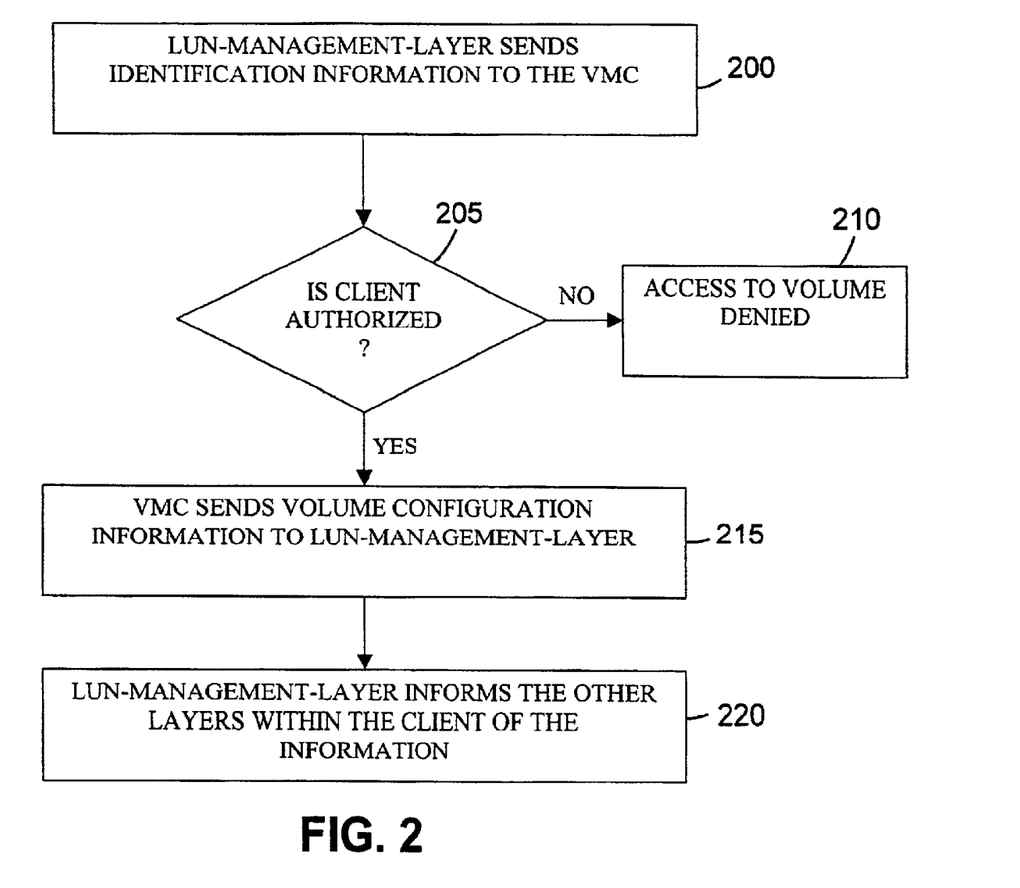
FIG. 2 is a flow chart of a client initialization process according to the present invention.

FIG. 2 is a flow chart of a client initialization process according to the present invention. When a client is initialized, the VMC usually first authenticates the client before it can access the storage resources. The client sends 200, via the LUN-management-layer, a client identifier to the VMC. The client identifier may be a physical signature representing a unique identifier assigned to each client allowing the VMC to identify and authenticate a particular client. Upon receipt of the client identifier, the VMC processes the client identifier and evaluates 205 which volumes the client is authorized to access. If the client is not authorized, then access is denied 210. If the client is granted access, then the VMC sends to the LUN-management-layer of the client configuration information 215 including which volumes within the storage resource the client is permitted to access. A list of permitted volumes for each client is maintained in the volume-configuration-layer of the VM. Once the LUN-management-layer receives the configuration information, it makes it available 220 to the other layers within the client. This technique makes it more difficult for unauthorized clients to gain access to the storage resources. This method also provides a scalable mechanism for managing access to the SAN from different client computers, since a single VMC can manage any number of volumes for the clients.

Figure 3:
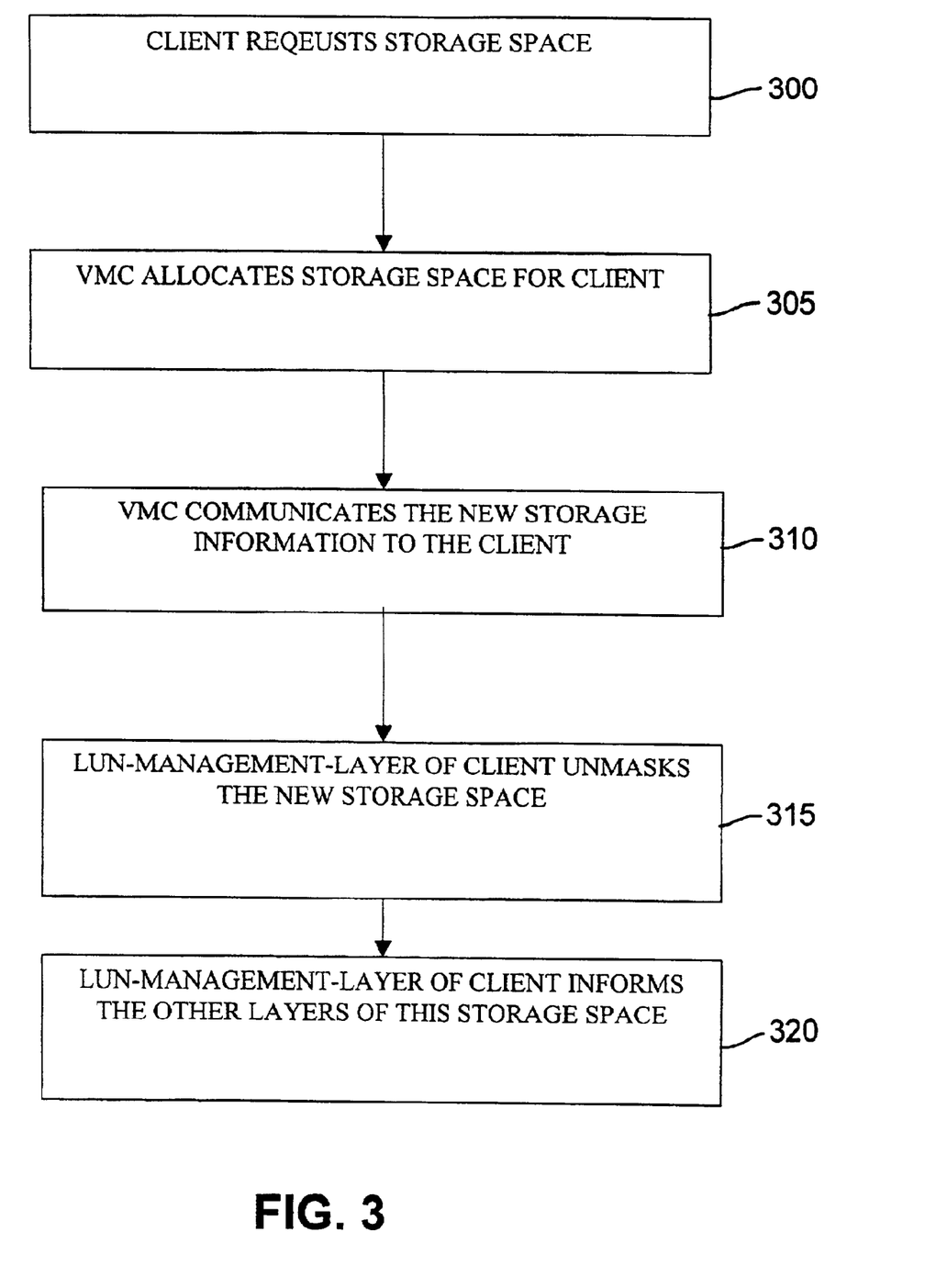
FIG. 3 is a flow chart of a storage resource space allocation process according to the present invention.

FIG. 3 is a flow chart of a storage resource space allocation process according to the present invention. When a client system requires additional storage space, the LUN-management layer of the client issues a storage space request 300 to the VMC. In response, the VMC attempts to allocate 305 enough space to satisfy the space request. However, if there is insufficient storage space from a pool of storage resources, then the VMC may not be able to satisfy the request. If the VMC can accommodate the request, it communicates 310 new volume information corresponding to the new storage space to the client. Upon receipt of the new volume information from the VMC, the LUN-management layer of the client unmasks 315 access to the volumes corresponding to the new storage space. In addition, the LUN-management layer informs 320 the other layers in the CVM of the new volume information.

For example, the LUN-management-layer informs the concatenation-layer of the CVM of the new volume information. In turn, the concatenation-layer makes the storage resources appear as one logical device to the client based on the new volume information. The client system processes the new storage space without needing to know the details of the underlying storage space. For example, if the client system is running Windows-NT®, then the new logical device is now visible under the Disk Administrator, however, the physical disk resources are still hidden from the client system. Other behavior appropriate to each client OS may occur.

Figure 4:
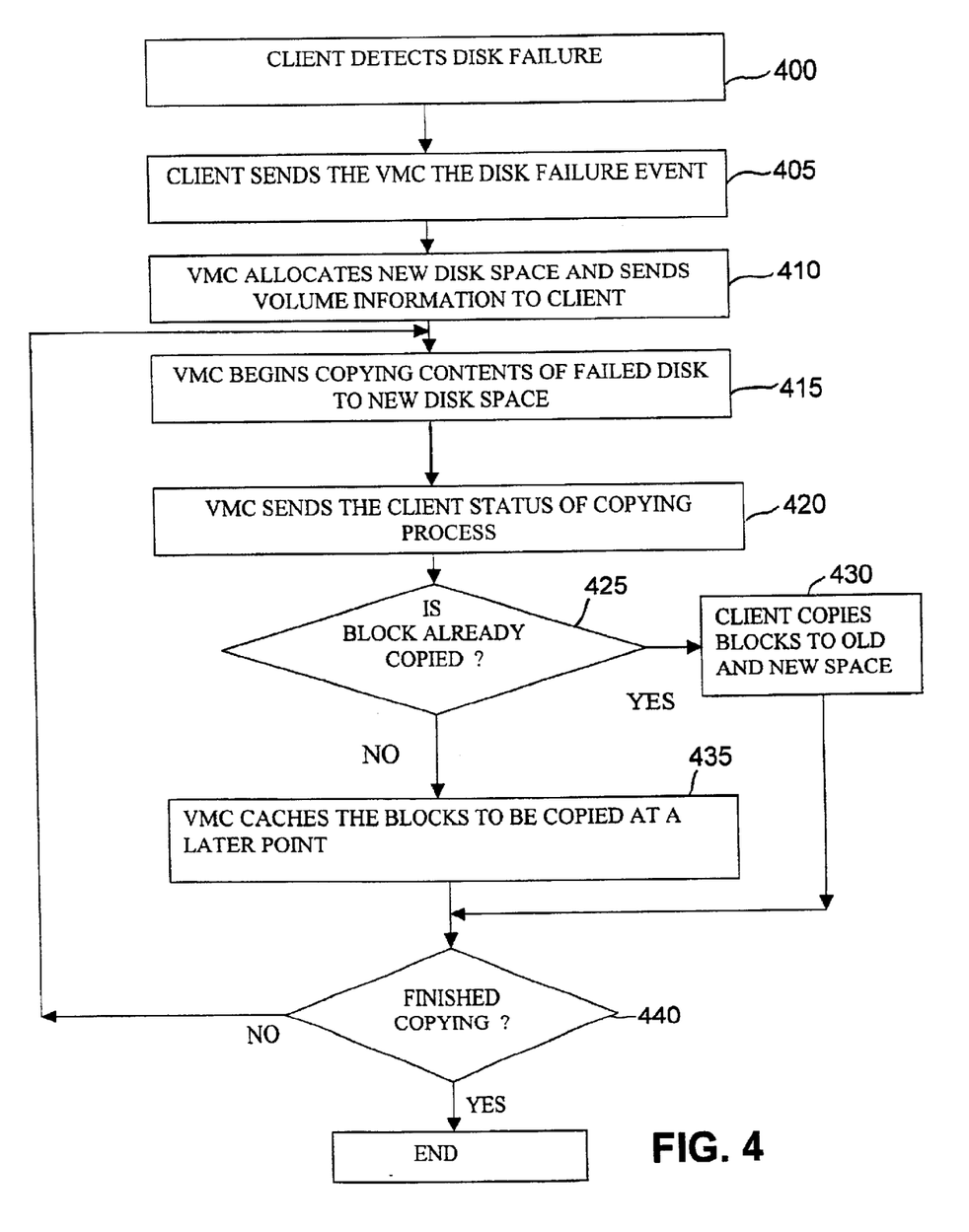
FIG. 4 is a flow chart of a client system disk failure process according to the present invention.

FIG. 4 is a flow chart of a client system disk failure process according to the present invention. When a client detects 400 a storage resource failure, it communicates 405 this event to the VMC so that it can begin to execute a recovery process. In one embodiment, the volume-recovery-layer in the VMC manages this process. Thus, when the VMC receives the failure event, it creates 410 a virtual device. Further I/O requests issued by the client are subsequently redirected 415 to the new virtual device managed by the VMC. The VMC now has all the information necessary to recover the data from the failed volume. The recovery process is offloaded 420 to the VMC since it can perform this task more efficiently then the client. This results in a faster recovery and relieves the client system from performing this process. Moreover, the system administrator now has a single administrative contact to manage the recovery process. Once the volume is recovered, the VMC contacts 425 the LUN-management-layer of the client with the new state of the volume including any new devices where further I/O should be directed.

Figure 5:
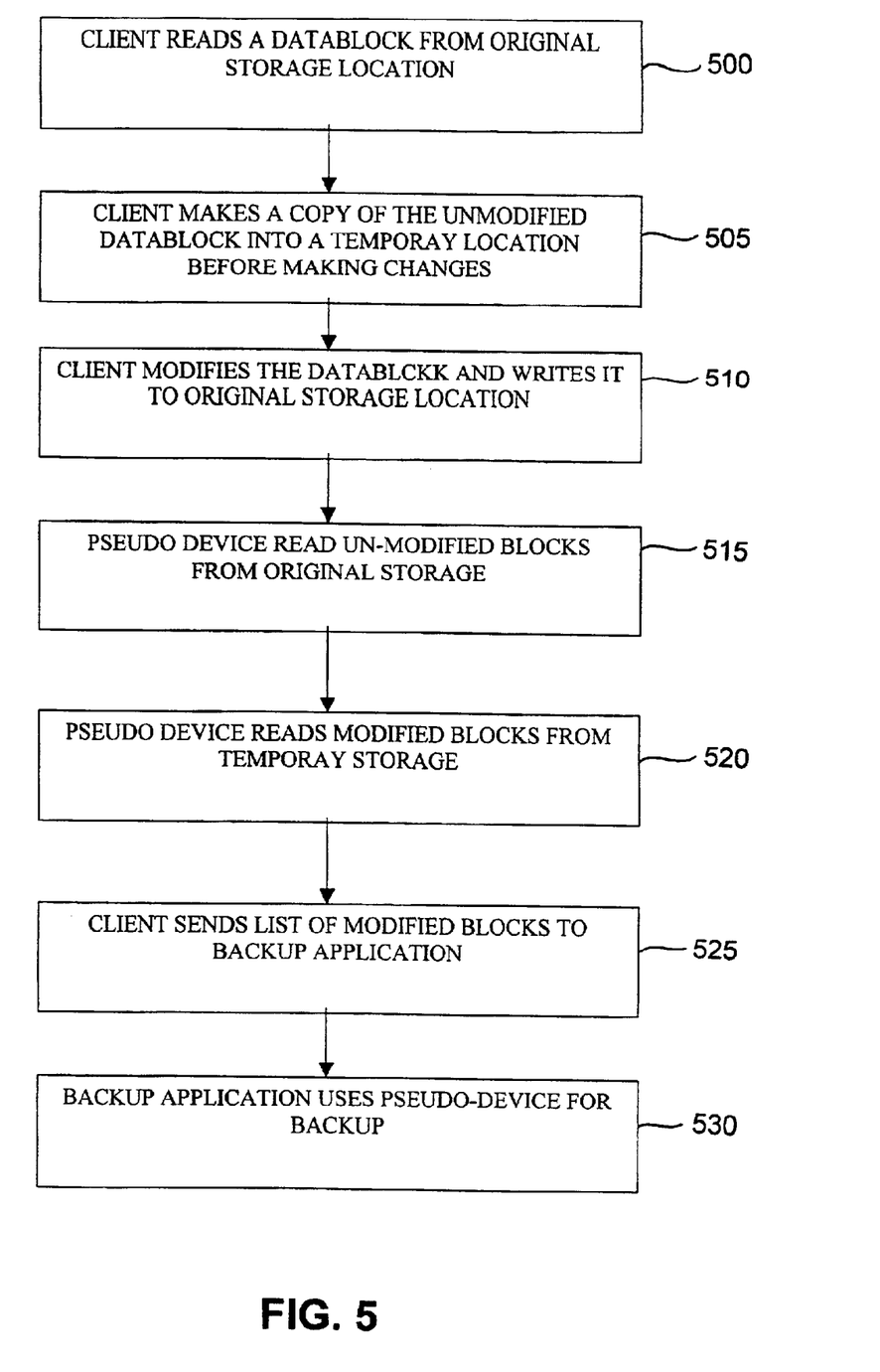
FIG. 5 is a flow chart of the recovery process when one half of a mirror fails according to the present invention.
Figure 6:
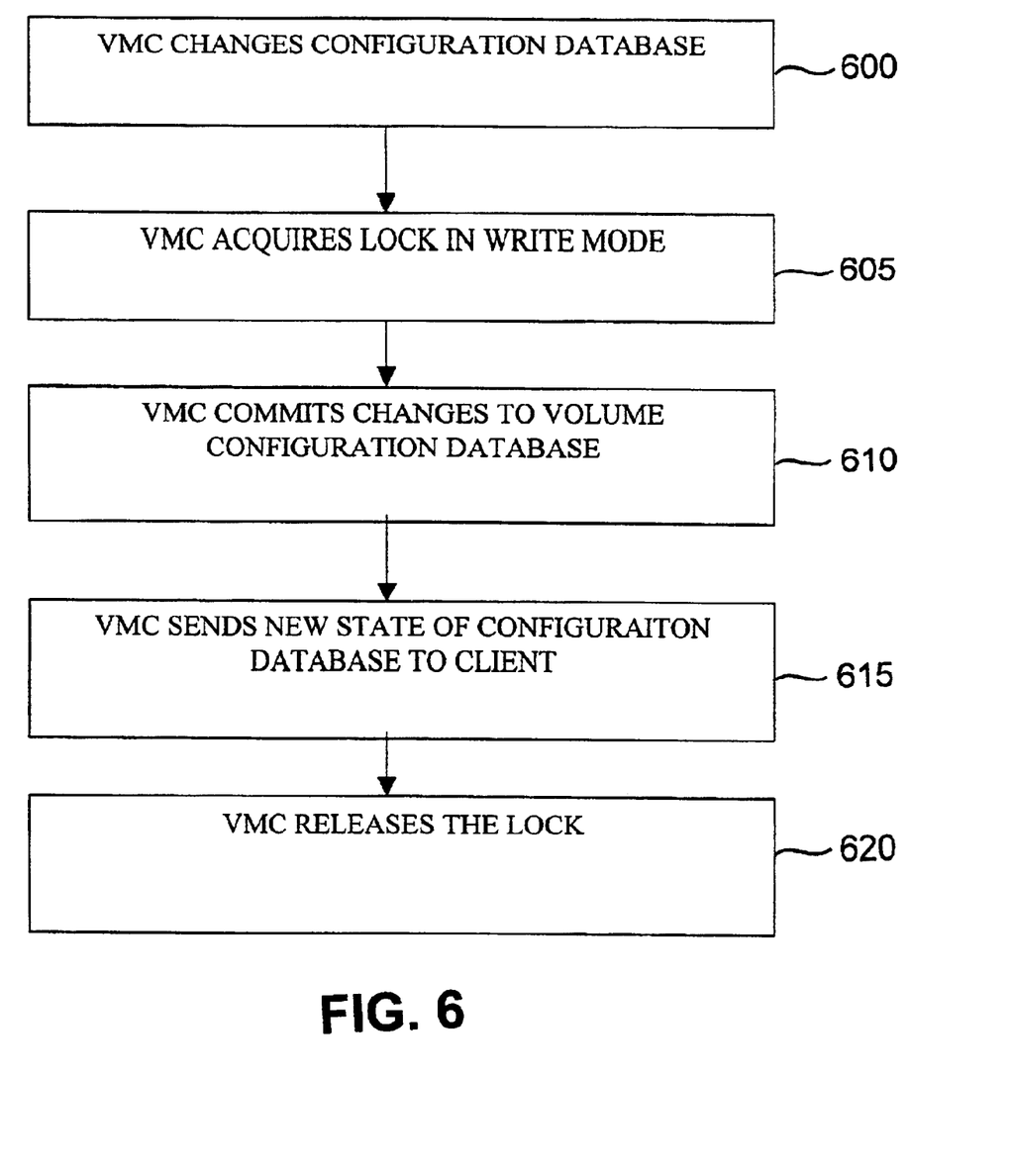
FIG. 6 is a flow chart of a backup process according to the present invention.

FIG. 5 is a flow chart of a disk failure recovery process for a mirrored disk according to the present invention. The client systems 12, 13, 14 have the capability of detecting 500 a storage device failure while it is accessing a storage device. Upon detection, the client communicates 505 this failure condition to the VMC. In response to receiving the failure condition, the VMC attempts to allocate 510 enough storage space to create a virtual disk to serve as a replacement mirror device. Once the new mirror device is created, the VMC sends its volume information to the client. The VMC then begins to copy 515 the contents of the original device (from the remaining working disks in the mirror group) to the new mirror device. While the VMC is copying the contents of the original device, it periodically updates 520 the client with the progress and status of the copying operation. The client uses this progress information to decide 522 where to direct the next write operation. If a write of a disk block has already been copied 525, the client writes the data block to the mirror device and to the original device 530. Otherwise, if a write to a disk block has not been copied, then the write operation is directed 535 to the VMC and cached by the VMC until that data block is copied to the new mirror device. The process continues until 540 the copying process is complete. This distributed method enables the VMC and the client to cooperate during the recovery process. This method applies to RAID levels 0 and 1 and can be used to accelerate the recovery process for RAID levels 4 and 5. In the RAID 4 and 5 level configurations, a failure of a device requires the VMC to replace the failed device and to rebuild the parity information FIG. 6 is a flow chart of a backup process according to the present invention. The snapshot-layer of the client system is capable of performing reliable backups of data residing on the storage resources. While the client is reading data blocks 600 from an original storage location corresponding to the storage resource, it makes a backup 605 copy of the disk blocks to a temporary storage location before modifying them. The client then modifies 610 the data blocks and writes them back to the original storage location. This technique, called a "copy-on-write", provides a frozen view of an active storage resource. To create a frozen view of the storage resource, a pseudo-device is created. The pseudo-device is basically a logical device created from physical storage that behaves like a physical device. Once the device is created, it proceeds to read 615 the unmodified blocks from the original storage location. However, the device reads the original version 620 of the modified blocks from the temporary storage location used to hold the temporary copy. The snapshot-layer creates a list of modified blocks which it sends 625 to a backup application residing on the VMC. The backup application can then use 630 this list to backup only those blocks that have been changed since the last backup. The backup application uses the pseudo-device to read the data to be backed up. Since the snapshot-layer resides on the client system, fast incremental backups are possible.

Figure 7:
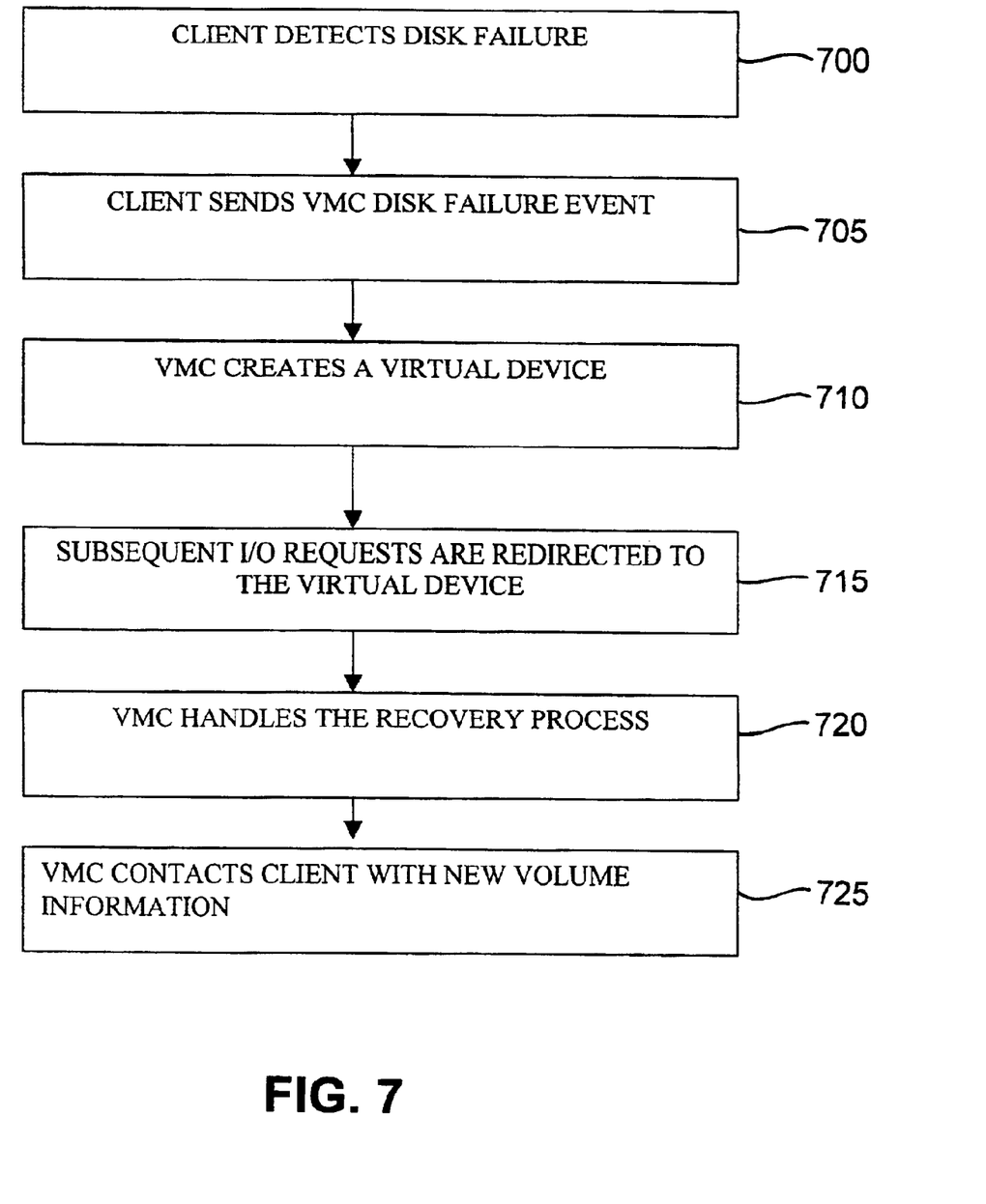
FIG. 7 is a flow chart of a volume configuration update process according to the present invention.

FIG. 7 is a flow chart of the volume configuration update process according to the present invention. A reader-writer lock mechanism is used by the volume-configuration-layer of the VMC to protect the storage resource information from being used while being updated by the VMC, thereby preventing clients from receiving inconsistent views of the storage configuration. The VMC makes changes 700 to the configuration but does not commit the changes. For example, the VMC may expand the total storage space available from a storage resource pool. Once the VMC is ready to commit the changes, it acquires 705 the lock in write mode. Since the VMC has exclusive control of the lock during this commit period, the client systems are prevented from using the storage resources during this time. However, since the actual duration of the commitment operation is typically short, the impact on client performance is minimal. The VMC then commits 710 the previous changes. Once the VMC is complete updating and committing changes, it then communicates the new state 715 of the volume information to the client system. It then releases 720 the lock so that client systems can access the updated storage resources. This technique enables the VMC to take precedence over the client system whenever the VMC desires to acquire the lock.

Certain embodiments according to the invention have been described. Nevertheless, it will be understood that various modifications may be made without departing from the spirit and scope of the invention. For example, the backup method can be configured to create several snapshots of the storage resources and then allow the backup applications in the server to process the backups in parallel. Accordingly, other embodiments are within the scope of the following claims.

We claim:

1. A method of managing storage resources associated with a network having at least one storage resource coupled to at least one server and at least one client over at least one data path, wherein said server manages said storage resources over said data path, and wherein said client directs I/O requests to said storage resources and redirects I/O requests to said server upon the detection of a failure condition, the method further includes:

allocation of a new storage space from said storage resource in response to a receipt of a failure condition from a client;

initiation of the recovery of the contents associated with said failure condition in cooperation with said new storage space; and communication of a recovery status to said client, wherein said client and said server continue said recovery based on said recovery status.

2. The method of claim 1 wherein said new storage space includes a new disk associated with a new physical storage resource.

3. A method of managing storage resources associated with a network having at least one storage resource coupled to at least one server and at least one client over at least one data path, wherein said server manages said storage resources over said data path, and wherein said client directs I/O requests to said storage resources and redirects I/O requests to said server upon the detection of a failure condition, the method which further includes:

providing a copy of unmodified data blocks before modifying said data blocks; and communicating a list of said modified data blocks to a backup process residing on said server, wherein said backup process uses a pseudo-device to read said unmodified and modified data blocks.

4. A distributed shared storage resource management system comprising:

at least one storage resource coupled to at least one server and at least one client over at least one data path, wherein said server manages said storage resource over said data path, and said client directs I/O requests to said storage resource and redirects said I/O requests to said server upon the detection of a failure condition, wherein said server is configured to:

allocate a new storage space from said storage resource in response to a receipt of a failure condition from a client;

initiate the recovery of the contents associated with said failure condition in cooperation with said new storage space; and communicate to said client the recovery status, wherein said client and said server continue said recovery based on said recovery status.

5. The system of claim 4 wherein said new storage space includes a new disk associated with new physical storage resource.

6. A distributed shared storage resource management system comprising:

at least one storage resource coupled to at least one server and at least one client over at least one data path, wherein said server manages said storage resource over said data path, and said client directs I/O requests to said storage resource and redirects said I/O requests to said server upon the detection of a failure condition, wherein said client is configured to:

provide a copy of unmodified data blocks before modifying said unmodified data blocks; and communicate a list of said modified data blocks to a backup process residing on said server, wherein said backup process uses a pseudo-device to read said unmodified and modified data blocks.

7. An article comprising a computer-readable medium that stores computer executable instructions for causing a computer in a distributed shared storage resource management system which comprises at least one storage resource coupled to at least one server and at least one client over at least one data path, wherein said computer executable instructions cause said server to manage said storage resource over said data path, and said client to direct I/O requests to said storage resource and redirect said I/O requests to said server upon the detection of a failure condition, the article further comprising instructions to:

allocate a new storage space from said storage resource in response to a receipt of a failure condition from a client;

initiate a recovery of the contents associated with said failure condition in cooperation with said new storage space; and communicate a recovery status to said client, wherein said client and said server continue said recovery based on said recovery status.

8. The article of claim 7 wherein said new storage space includes a new disk associated with a new physical storage resource.

9. An article comprising a computer-readable medium that stores computer executable instructions for causing a computer in a distributed shared storage resource management system which comprises at least one storage resource coupled to at least one server and at least one client over at least one data path, wherein said computer executable instructions cause said server to manage said storage resource over said data path, and said client to direct I/O requests to said storage resource and redirect said I/O requests to said server upon the detection of a failure condition, the article further comprising instructions to:

provide a copy of unmodified data blocks before modifying said unmodified data blocks; and communicate a list of said modified data blocks to a backup process residing on the server, wherein said backup process uses a pseudo-device to read said unmodified and modified data blocks.

* * * * *